C. A. A. RAND.
GRAIN HARVESTER.
APPLICATION FILED NOV. 10, 1910.
990,901.
Patented May 2, 1911.
2 SHEETS—SHEET 2.
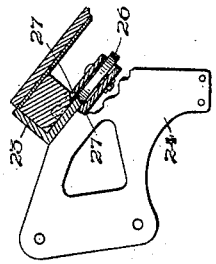
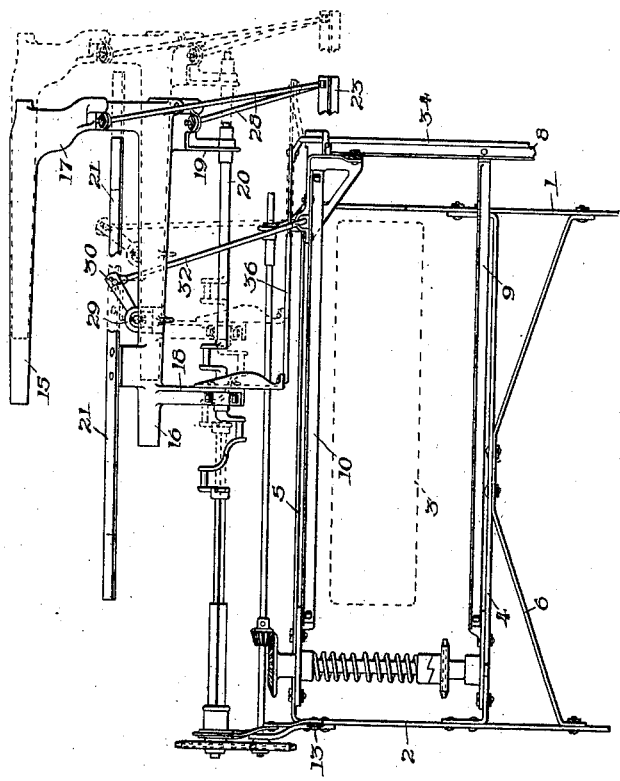

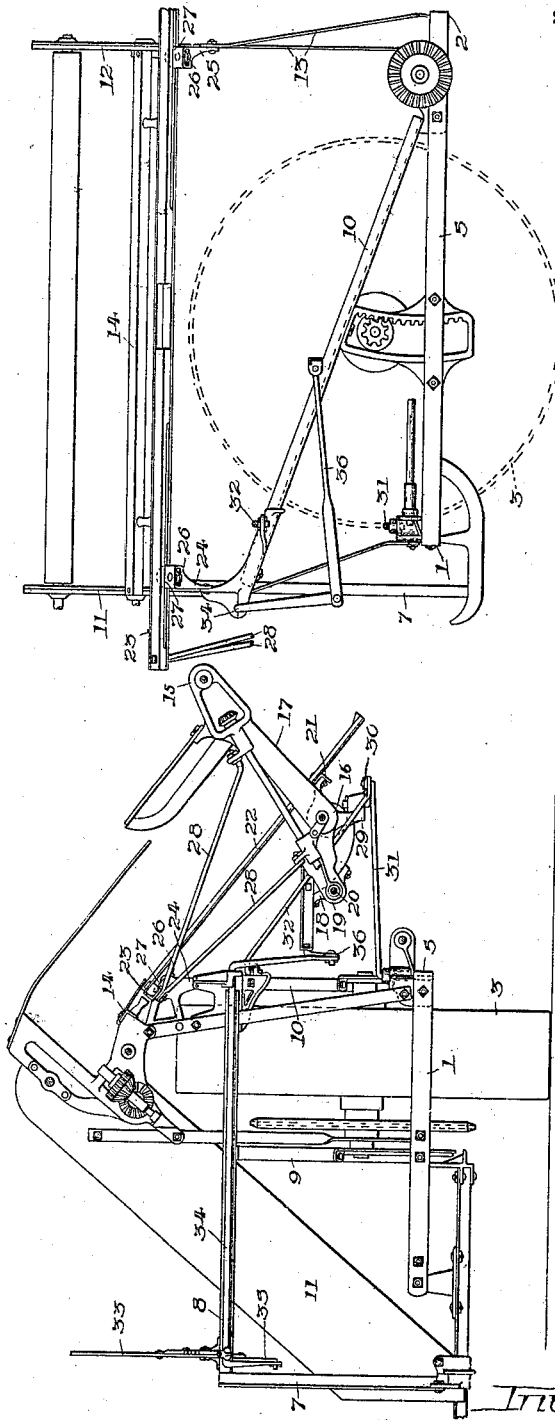

UNITED STATES PATENT OFFICE.

CHARLES A. A. RAND, OF CHICAGO, ILLINOIS, ASSIGNOR TO INTERNATIONAL HARVESTER COMPANY, A CORPORATION OF NEW JERSEY.

GRAIN-HARVESTER.

990,901. Specification of Letters Patent. Patented May 2, 1911.

Application filed November 10, 1910. Serial No. 591,553.

*To all whom it may concern:*

Be it known that I, CHARLES A. A. RAND, a citizen of the United States, residing at Chicago, in the county of Cook and State of Illinois, have invented certain new and useful Improvements in Grain-Harvesters, of which the following is a specification.

My invention relates to grain harvesters, and in particular to the construction and manner of supporting the binding attachment forming a part thereof, its object being to provide simple and durable means whereby the binding attachment may be connected with the harvester in a manner to be easily and readily adjusted as required to meet the varying crop conditions and to be rigid in its operative position. These objects are attained by means of the mechanism illustrated by the accompanying drawing, in which—

Figure 1 represents a front elevation of part of a grain harvester having my invention embodied in its construction; Fig. 2 is a side elevation of Fig. 1 having the drive wheel and part of the binding attachment cut away; Fig. 3 is a top plan view of the wheel frame of a harvester, the drive wheel being shown by dotted lines and the grain platform and part of the binding attachment cut away and showing the manner of connecting the binding attachment therewith; and Fig. 4 is a detail representing part of the connecting means.

The same reference characters designate like parts throughout the several views.

The wheel frame of the harvester includes front and rear frame members 1 and 2, respectively, connected at opposite sides of the traction wheel 3 by means of cross frame members 4 and 5, the grainward cross member 4 having a brace member 6 secured to its middle portion and opposite ends of the brace member secured to the front and rear wheel frame members.

7 represents an upwardly extending frame at the front of the machine, having its lower end connected with the front member of the wheel frame, and including a transverse bar 8 at its upper end, and downwardly and rearwardly extending brace members 9 and 10 upon the grainward and stubbleward sides of the traction wheel, respectively, that are connected at their lower ends with the wheel frame.

11 represents a front elevator frame secured to and supported by frame 7, and 12 the rear elevator frame supported by upwardly extending frame members 13 at the rear of the machine, the upper ends of the front and rear members of the elevator being connected by means of a cross bar 14.

The binding attachment includes a U-shaped frame having upper and lower tubular arms 15 and 16, connected at their forward ends by means of a head piece 17.

18 and 19 represent arms integral with the lower arm 16 and extending forward toward the harvester are provided with bearings in which a packer shaft 20 is journaled.

21 represents a bar secured to arm 16 and extending in a fore and aft direction, and adapted to support the deck 22, that has its stubbleward end secured thereto. The upper and grainward end of the deck is secured to a rail 23 that is slidably mounted in brackets 24 and 25 that are secured to the front and rear members, respectively, of the elevator frame, the brackets being provided with anti-friction rollers 26 journaled thereon and bearing against the lower edge of the rail. A clip 27 overlaps the edge of the rail and is operative to retain the rail in contact therewith. The supplemental connection between the frame and the rail includes rods 28, having their upper ends secured to the rail at its forward end, and their lower diverging ends to the head piece 17.

29 represents a downwardly extending arm integral with the tubular arm 16, near its rear end, and provided with a vertical opening that receives one end of a swinging link 30, the opposite end of the link being pivotally connected with the wheel frame of the machine by means of a horizontally arranged link 31, and to the elevator frame by means of an upwardly extending brace rod 32, constituting a triangular swinging support for the binding attachment intermediate its ends.

The mechanism for adjusting the binding attachment relative to the harvester frame includes a hand lever 33 mounted upon the frame of the harvester, a rock shaft 34 mounted in bearings at the front end of the elevator frame and provided with crank arms at opposite ends thereof, one of said arms being connected with the hand lever by means of a link 35, and the other to the binding attachment by means of a link 36. The entire weight of the binding attachment is largely supported by the swinging link 31 and brace rod 32, and the sliding connection of the rail 23 with the brackets prevents the attachment from swinging outward or inward at its upper side.

What I claim as my invention, and desire to secure by Letters Patent, is:

1. A grain harvester including, in combination, a wheel frame, an elevator supporting frame, a binding attachment including upper and lower tubular arms, a deck, a rail secured to the grainward side of said deck and having a sliding connection with said elevator supporting frame, a downwardly extending arm integral with said lower arm and provided with a vertically arranged opening, a swinging link having one end received by said opening, the opposite end of said link being pivotally connected with said wheel frame by means of a horizontally arranged link and to the elevator frame by an upwardly extending brace rod, said rail having its forward end connected with said binding attachment by means of downwardly and outwardly extending rods.

2. A grain harvester including, in combination, a wheel frame, an elevator supporting frame, a binding attachment including upper and lower tubular arms, a deck, a rail secured to the grainward side of said deck, brackets secured to opposite sides of said elevator frame, said brackets having antifriction rollers journaled thereon, said deck rail engaging with said rollers and movable thereon, a retaining clip carried by said brackets and engaging with said rail, a horizontally arranged swinging link having its grainward end pivotally connected with said wheel frame and its opposite end with the lower arm of said binding attachment, a swinging link having its grainward end pivotally connected with said elevator frame coaxially with said horizontal link and extending downward and outward, having its opposite end pivotally connected with said lower arm coaxially with said horizontal link, said rail having its forward end connected with said binding attachment by means of downwardly and outwardly extending rods.

CHARLES A. A. RAND.

Witnesses:
F. W. HOFFMEISTER,
H. J. JASMER.

Copies of this patent may be obtained for five cents each, by addressing the "Commissioner of Patents, Washington, D. C."